United States Patent [19]
Nims

[11] Patent Number: 5,799,484
[45] Date of Patent: Sep. 1, 1998

[54] DUAL TURBOGENERATOR AUXILIARY POWER SYSTEM

[75] Inventor: Robert A. Nims, Rancho Palos Verdes, Calif.

[73] Assignee: Allied Signal Inc. Morris Township, N.J.

[21] Appl. No.: 839,746

[22] Filed: Apr. 15, 1997

[51] Int. Cl.$^6$ .................................................. F02C 6/00
[52] U.S. Cl. ...................... 60/39.15; 60/39.511; 290/4 D
[58] Field of Search ................................ 60/39.142, 39.15, 60/39.33, 39.511; 290/4 R, 4 A, 4 D

[56] References Cited

U.S. PATENT DOCUMENTS

| | | | |
|---|---|---|---|
| 2,322,987 | 6/1943 | West ................................... | 60/39.511 |
| 2,589,853 | 3/1952 | Owner et al. . | |
| 2,619,795 | 12/1952 | Drake . | |
| 2,662,371 | 12/1953 | Rennie et al. . | |
| 2,723,531 | 11/1955 | Wosika et al. . | |
| 3,242,347 | 3/1966 | Dotson ................................... | 60/39.15 |
| 3,416,309 | 12/1968 | Elmes et al. ........................... | 60/39.15 |
| 3,868,818 | 3/1975 | Itoh . | |
| 4,159,623 | 7/1979 | McReynolds . | |
| 4,369,630 | 1/1983 | Bloomfield . | |
| 5,239,830 | 8/1993 | Banthin et al. . | |

FOREIGN PATENT DOCUMENTS

| | | | |
|---|---|---|---|
| 45621 | 2/1990 | Japan ...................................... | 60/39.15 |

OTHER PUBLICATIONS

Technical Report 95–GT–444, "Development of An Oilless, Gearless, and Bleedable Under Armor Auxiliary Power Unit", by Robert Nims, presented at the ASME International Gas Turbine and Aeroengine Congress and Exposition, Houston, Texas, Jun. 5–8, 1995.

Technical Report 94–67330, "Development of A 22–KW, Low–Emission Turbogenerator For A Hybrid Electric Bus", by Pat O'Brien, prepared for the Environmental Vehicles Conference & Exposition, Jan. 23–25, 1995, The Engineering Society of Detroit.

*Primary Examiner*—Louis J. Casaregola
*Attorney, Agent, or Firm*—John R. Rafter

[57] ABSTRACT

An auxiliary power system comprises two turbogenerators sharing a single combustor for delivery of elevated pressure and temperature gas to both the turbogenerators, a single fuel system for supplying elevated pressure fuel to the single combustor, and a single electronic unit for conditioning the electrical power input and output. The auxiliary power system also comprises first and second recuperator means operating in association with the dual turbogenerators for transferring heat from turbine exhaust to air entering the single combustor. The entire recuperator volume is used in both the single and dual turbogenerator operating modes.

11 Claims, 2 Drawing Sheets

1

DUAL TURBOGENERATOR AUXILIARY POWER SYSTEM

TECHNICAL FIELD

The present invention generally pertains to gas turbine auxiliary power units and, more particularly, to a dual turbogenerator auxiliary power system which optimizes the auxiliary power system operation at part load conditions instead of at peak power.

BACKGROUND OF THE INVENTION

Auxiliary power unit (APU) technologies to lower APU life cycle cost have not progressed significantly in the last twenty years, resulting in only minor reductions through aerodynamic performance enhancements. Past attempts at applying gas turbine technology to the automotive industry have not been successful. This was due to the complexity of a conventional gas turbine and the expensive materials used for the hot-end components. Conventional gas turbines employ a step-down gearbox to drive the generators, and an oil system that includes pumps, filters, seals, sumps, and other controls. Simple cycle gas turbines consist of a compressor, combustor, turbine and various components for producing useful power. Where high efficiency is achieved, it is through high pressure ratios and high turbine inlet temperatures.

It would be desirable, then, to provide a compact power source that can be used in industrial, automotive and aerospace applications, that is able to run high delivery at part-load conditions.

SUMMARY OF THE INVENTION

The present invention provides a turbogeneration system that offers clean, quiet, cost-effective, and portable energy generating capability for a host of power-generation needs. The dual turbogenerator according to the present invention provides distributed generation, standby power, off-grid power generation, portable power, and cogeneration. The dual turbogenerator auxiliary power system is particularly advantageous for use on hybrid electric vehicles, which demand a low cost heat engine (to drive an electrical generator) that can deliver high thermal cycle efficiencies at loads as low as 10% of the maximum rated power of the engine. The present invention has a system design which has high thermal cycle efficiency throughout its operating range, and down to 10% of rated power.

In accordance with one aspect of the present invention, an auxiliary power system comprises a pair of essentially identical one-half rated power turbogenerators, sharing a single combustor, fuel system and electronic unit. A first turbogenerator, comprising a first turbine, first compressor and first generator, is mounted on a first high-speed shaft supported on air bearings. A second turbogenerator, comprising a second turbine, second compressor and second generator, is mounted on a second high-speed shaft also supported on air bearings. The air bearings eliminate the need for an oil-based lubrication system. The first and second generators are built into the respective first and second shafts and rotate at the same speed as the respective shaft, eliminating the need for a gearbox, and creating a power generating system with just one moving part. Each two-pole permanent magnet generator rotor produces, for example, more than 25 kW of electrical power at approximately 100,000 rpm, although, of course, this number can be scaled to higher and lower power levels, depending on the particular application. Furthermore, the number of turbogenerators can vary, as can the power output of each turbogenerator.

In the drawings as hereinafter described, a preferred embodiment is depicted; however, various other modifications and alternative constructions can be made thereto without departing from the true spirit and scope of the invention.

BRIEF DESCRIPTION OF THE DRAWINGS

The novel features of the invention are set forth with particularity in the appended claims. The invention itself, however, both as to organization and method of operation, together with objects and advantages thereof, may best be understood by reference to the following description taken in conjunction with the accompanying drawings in which:

DETAILED DESCRIPTION OF THE INVENTION

By way of example only, the dual turbogenerator auxiliary power system (APS) is described throughout as a system capable of delivering up to 50 kW of electrical power. It will be obvious to those skilled in the art, however, that the use of 50 kW as an example should not be construed as limiting the size range for the concept disclosed herein. The concept is scalable to auxiliary power systems with both smaller and larger peak power delivery capabilities, without departing from the scope of the invention.

In accordance with the present invention, the APS operation of the system is optimized at part load conditions instead of at peak power. Hence, the present invention proposes the use of two smaller turbogenerators, rather than a single full power turbogenerator, such as is described in Technical Report 95-GT-444, entitled "Development of An Oilless, Gearless, and Bleedable Under Armor Auxiliary Power Unit", by Robert Nims, presented at the ASME International Gas Turbine and Aeroengine Congress and Exposition, Houston, Texas, Jun. 5–8, 1995, and incorporated herein in its entirety by reference; and such as is also described in Technical Report 94-67330, entitled "Development of A 22-KW, Low-Emission Turbogenerator For A Hybrid Electric Bus", by Pat O'Brien, prepared for the Environmental Vehicles Conference & Exposition, Jan. 23-25, 1995, sponsored by The Engineering Society of Detroit, and incorporated herein in its entirety by reference.

Figure 1:
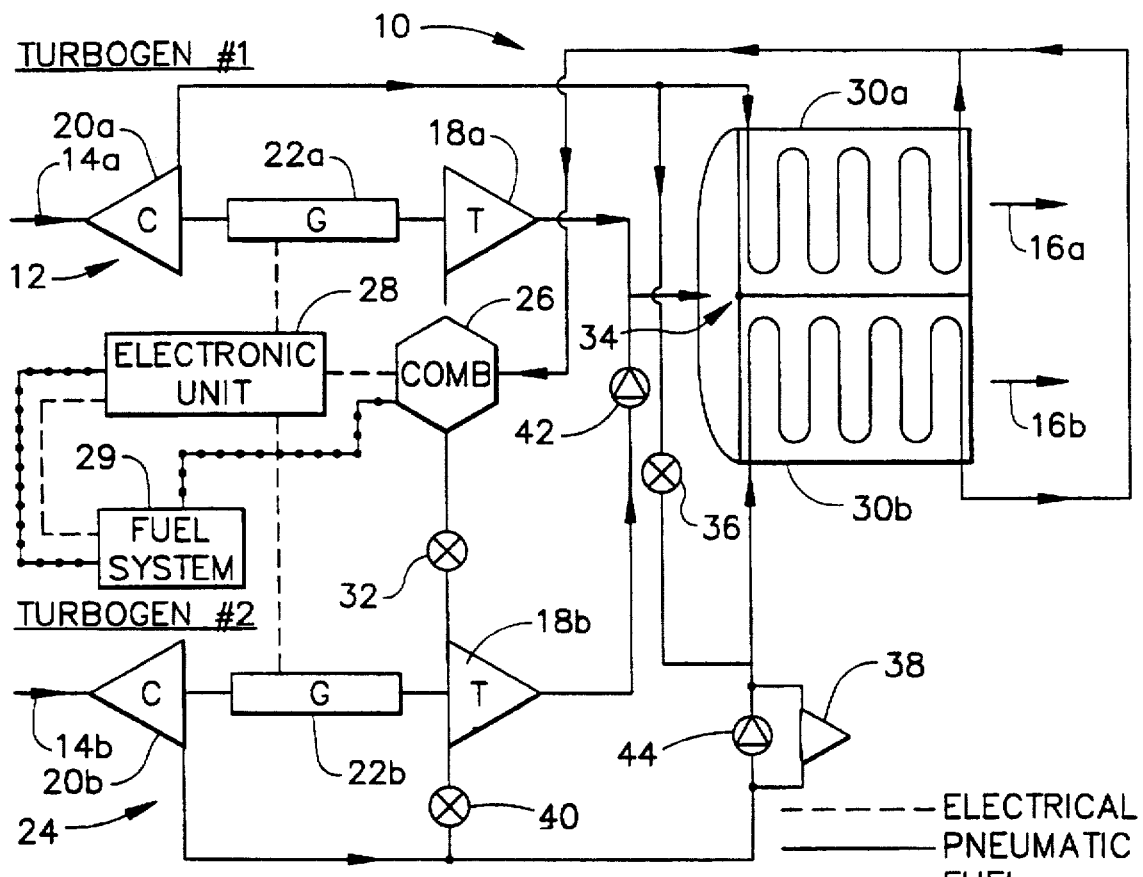
FIG. 1 is schematic diagram illustrating principal elements of a dual turbogenerator auxiliary power system in accordance with the present invention.

Referring now to the drawings, in FIG. 1 there is illustrated a schematic block diagram of a dual turbogenerator auxiliary power system 10 in accordance with the present invention. In the dual turbogenerator of the present invention, a first turbogenerator 12 comprises an air inlet side 14a and an exhaust side 16a. The first turbogenerator 12 further comprises a turbine 18a, compressor 20a and generator 22a, mounted on a first high speed shaft. The shaft (not shown) comprises necessary components to connect the turbine to the generator and the generator to the compressor. Likewise, a second turbogenerator 24 comprises an air inlet side 14b and an exhaust side 16b. The second turbogenerator 24 further comprises a turbine 18b, compressor 20b and generator 22b, mounted on a second high speed shaft. The first and second turbogenerators 12 and 24 pneumatically share a single combustor 26, a single electronic unit 28, and a single fuel system 29. Each turbogenerator 12 and 24 has an associated recuperator 30a and 30b, respectively.

At low power conditions, only one turbogenerator, first turbogenerator 12 for purposes of illustration, is operated. At conditions above 50% power, both turbogenerators 12 and 24 operate. When only one turbogenerator is running, that turbogenerator uses both recuperators 30a and 30b. However, when both turbogenerators 12 and 24 run, the recuperators 30a and 30b, respectively, operate independently. Also, when both turbogenerators run, the single combustor 26 feeds both turbogenerators. Valve 32 opens to establish normal single cycle operation. The engine controller supervises and synchronizes the operation. In dual operation mode, the high pressure (or air side) 34 of the recuperator 30a and 30b halves are run independently. By closing valve 36, the compressor outlet flow is forced through recuperator 30b. Valve 36 closes to run the second recuperator 30b independently of the first recuperator 30a. Below 50% power, the second turbogenerator 24 is turned off by closing valve 32 and opening valve 36, and only the first turbogenerator 12 is operated, using both recuperators 30a and 30b. In this mode, the high pressure (or air side) 34 of the second recuperator 30b half is valved into the compressor discharge of the first turbogenerator 12 to take advantage of the full recuperator volume. This allows the system the ability to use the entire recuperator volume in either single or dual turbogenerator operating modes. This effectively results in a 100% recuperator volume increase when operating in the single turbogenerator operating mode. Hence, without significantly compromising the performance in the above 50% power delivery range, performance is substantially increased in the critical 10% to 50& power delivery range.

The dual turbogenerator auxiliary power system configuration of FIG. 1 results in a system that achieves the inherent benefits of having multiple heat engines but without the cost impact of multiple complete systems. More importantly, the dual recuperator use at below 50% power substantially increases performance of the system. In either mode, single or dual turbogenerator operation, the turbogenerator shaft speed is varied to maximize the thermal cycle efficiency under part loads. Turbogenerator speed control is based typically on constant turbine inlet temperature or exhaust gas temperature.

Figure 2A:
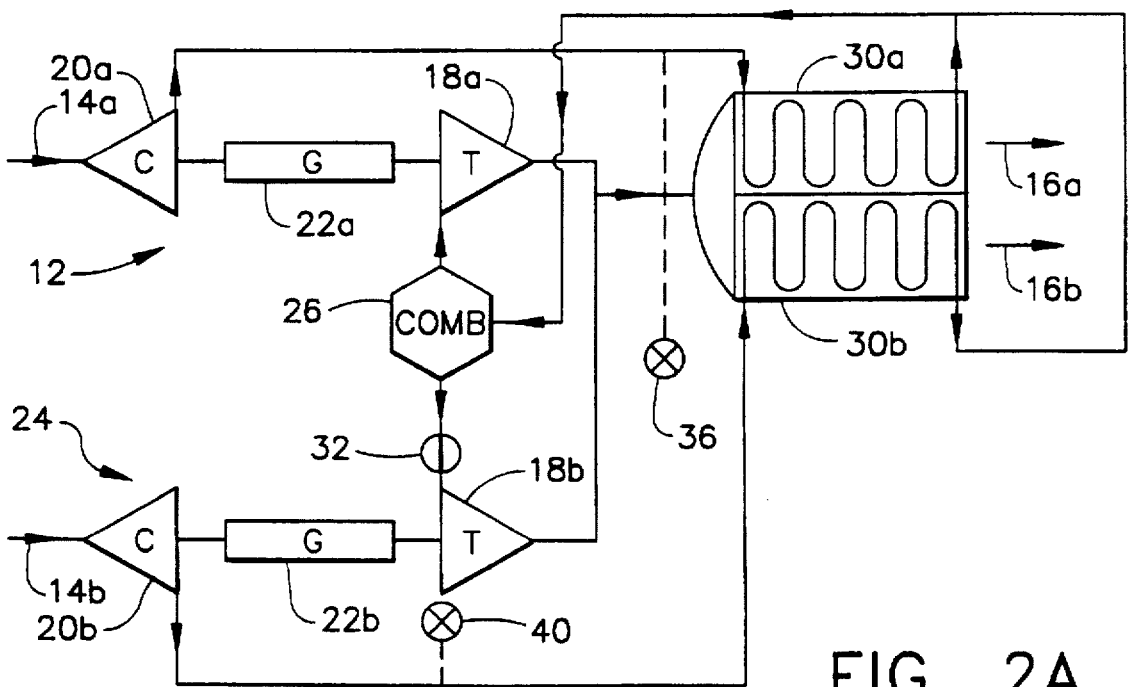
FIGS. 2A, 2B and 2C are schematic diagrams illustrating turbogenerator operating modes for the system of FIG. 1, responsive to the power requirement of the system.
Figure 2B:
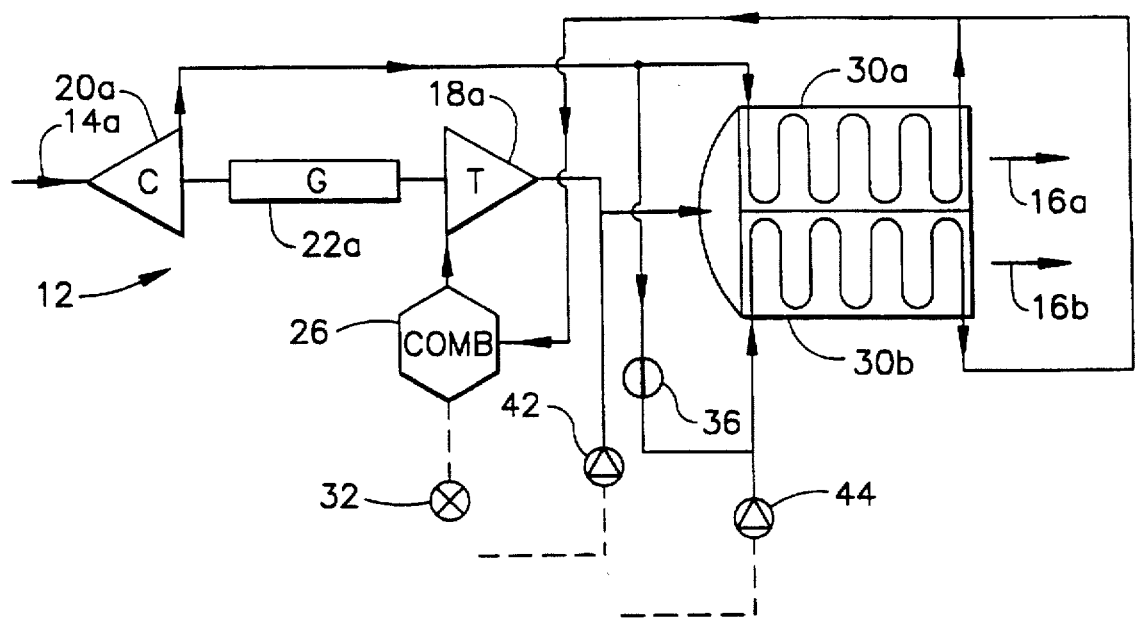
Figure 2C:
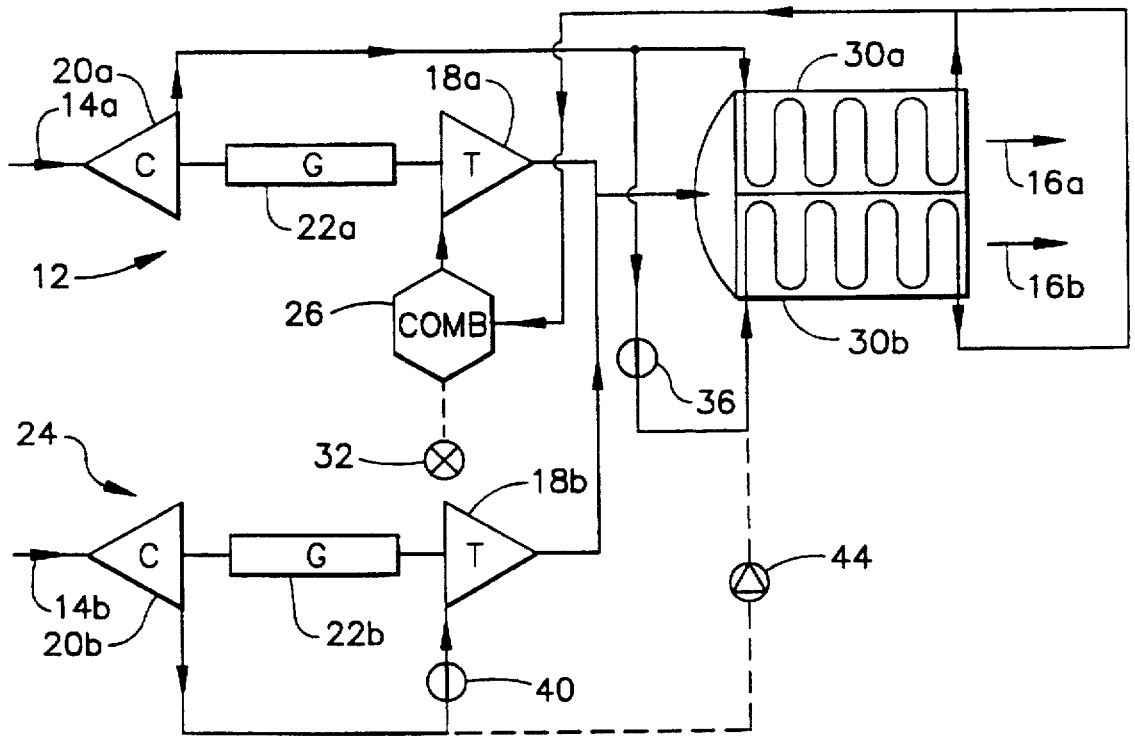

Referring now to FIGS. 2A, 2B and 2C, schematic diagrams illustrate the turbogenerator operating modes, responsive to the power requirement of the system. In steady state operating modes at greater than 50% peak power demand, both turbogenerators 12 and 24 are operating and the air/gas flows are directed as illustrated in FIG. 2A. Valve 32 is open and valves 36 and 40 are closed. In steady state operating modes below 50% peak power demand, only first turbogenerator 12 is operating and the air/gas flows are directed as shown in FIG. 2B. Valve 32 is closed and valve 36 is open. In this mode, second turbogenerator 24 is not running at all and first turbogenerator 12 is carrying the full load. The speed of turbogenerator 12 is varied to keep either the turbine inlet temperature or the exhaust gas temperature constant.

In transition modes, optimum startup is expected to be with the first turbogenerator only operating, which is illustrated in FIG. 2B. When higher power is needed and second turbogenerator 24 is commanded on, the optimum turbogenerator 24 motoring mode is expected to be to operate as a non-recuperated auxiliary power unit. The total system operation and air/gas flows during this startup mode is illustrated in FIG. 2C. Valve 32 is closed and valves 36 and 40 are open. The advantage of operating the second turbogenerator 24 in a non-recuperated mode during startup is that the first turbogenerator 12 continues to operate at a very high thermal cycle efficiency, because of the continued use of both recuperator sections 30a and 30b.

The switch over to dual turbogenerator operation following motoring of turbogenerator 24, to approximately 50% speed, can be accomplished by any of a variety of means. For example, first turbogenerator 12 can be decelerated until the compressor discharge pressures of each turbogenerator 12 and 24 are matched. This pressure modulation could trigger the delta P switch 38, as illustrated in FIG. 1. When the switch 38 is triggered, the three shutoff valves 32, 36 and 40, switch their states. Also shown are element 42 connected between first and second turbines 18a and 18b, and element 44 associated with switch 38.

While preferred embodiments of the present invention have been shown and described herein, it will be obvious to those skilled in the art that such embodiments are provided by way of example only. Numerous variations, changes, and substitutions will now occur to those skilled in the art without departing from the invention. Accordingly, it is intended that the invention be limited only by the spirit and scope of the appended claims.

I claim:

1. An auxiliary power system comprising:

a first turbogenerator having an associated first turbine, first compressor and first generator mounted on a first high-speed shaft;

a second turbogenerator having an associated second turbine, second compressor and second generator mounted on a second high-speed shaft;

a single electronic unit for conditioning externally supplied electrical power for startup/motoring of the first and second turbogenerators;

a single combustor for delivery of elevated pressure and temperature gas to both the first and second turbogenerators;

a single fuel system for safely supplying elevated pressure fuel to the single combustor; and first and second recuperator means operating in association with the first and second turbogenerators for transferring heat from turbine exhaust to air entering the single combustor.

2. An auxiliary power system as claimed in claim 1 wherein the first and second turbogenerators comprise essentially identical one-half rated power turbogenerators.

3. An auxiliary power system as claimed in claim 1 wherein the first turbogenerator comprises a first partial rated power turbogenerator and the second turbogenerator comprises a second partial rated power turbogenerator.

4. An auxiliary power system as claimed in claim 3 wherein the first partial rated power and the second partial rated power total a full rated power value.

5. An auxiliary power system as claimed in claim 1 further comprising means for operating the system in a single or a dual turbogenerator operating mode.

6. An auxiliary power system as claimed in claim 5 wherein the entire recuperator volume is used in both single and dual turbogenerator operating modes.

7. An auxiliary power system as claimed in claim 1 wherein the single electronic unit further comprises means for supervising, controlling and monitoring critical parameters and operation of the auxiliary power system.

8. An auxiliary power system as claimed in claim 1 wherein the system has high thermal cycle efficiency throughout its operating range.

9. An auxiliary power system as claimed in claim 8 wherein the operating range is from about 10% to about 100% of rated power.

10. An auxiliary power system as claimed in claim 1 wherein the first and second generators are configured to rotate at the same speed as the respective associated shaft, compressor and turbine.

11. An auxiliary power system as claimed in claim 1 wherein the single electronic unit further comprises means for conditioning electrical power input for turbogenerator startup and electrical power output of the system.

* * * * *